(12) United States Patent
Priola

(10) Patent No.: US 10,808,869 B2
(45) Date of Patent: Oct. 20, 2020

(54) TRACK ENGAGING CABLE HANGER AND METHOD

(71) Applicant: James W. Priola, San Clemente, CA (US)

(72) Inventor: James W. Priola, San Clemente, CA (US)

(73) Assignee: Airwall Hangers Corporation, San Diego, CA (US)

( * ) Notice: Subject to any disclaimer, the term of this patent is extended or adjusted under 35 U.S.C. 154(b) by 0 days.

(21) Appl. No.: 16/258,411

(22) Filed: Jan. 25, 2019

(65) Prior Publication Data

US 2020/0240552 A1 Jul. 30, 2020

(51) Int. Cl.
E04H 1/00 (2006.01)
F16L 3/26 (2006.01)
H02G 3/30 (2006.01)
H02G 3/04 (2006.01)

(52) U.S. Cl.
CPC .............. *F16L 3/26* (2013.01); *H02G 3/0437* (2013.01); *H02G 3/30* (2013.01)

(58) Field of Classification Search
CPC ............ F16L 3/26; H02G 3/0437; H02G 3/30

USPC .......... 248/74.1; 52/243.1, 241, 506.08, 243, 52/238.1

See application file for complete search history.

(56) References Cited

U.S. PATENT DOCUMENTS

| 7,958,684 | B2 * | 6/2011 | Kleege | .................... E04B 2/827 52/241 |
| 2014/0245689 | A1 * | 9/2014 | Voegele | .................. E04B 2/967 52/506.08 |
| 2018/0331523 | A1 * | 11/2018 | Ruebel | ................. H02G 3/0418 |

* cited by examiner

*Primary Examiner* — Todd M Epps
(74) *Attorney, Agent, or Firm* — Charmasson, Buchaca & Leach, LLP

(57) ABSTRACT

A barrier plate for supporting a cable within the internal channel of a ceiling mounted track having a pair of inwardly projecting parallel rails separated by a bottom slot. The barrier plate can be inserted completely into the internal channel and manipulated using a fingerhole through the plate to block downward movement of the cable through the slot. The plate can have radial disuniformities to frictionally bear against the pad of a user's finger to allow greater control of the plate orientation while engaged in the track channel.

17 Claims, 5 Drawing Sheets

TRACK ENGAGING CABLE HANGER AND METHOD

FIELD OF THE INVENTION

This invention relates to track fasteners and more specifically to devices used to suspend equipment and structures from tracks in ceilings, walls and other similar structural surfaces.

BACKGROUND

Arranging a site for a spectacle, meeting, or other gathering requires the temporary installation of a large amount of equipment and other structures. Often, space and setup time are limited. The ceilings of meeting rooms, convention centers, civic centers, classrooms, banquet facilities, conference centers, lecture halls, hotel ballrooms, restaurants, and other public gathering facilities are often crisscrossed by tracks, typically made of extruded steel or aluminum, from which movable room dividers or curtain partitions are suspended.

Suspending some items from ceilings, beams or other overhead elements or attaching them to walls in a very secure, but also quickly adjustable manner, frees up floor space for additional seating so that capacities and thus revenue for a given room can be increased. For example, lighting apparatuses for a stage, loudspeakers, cabling, props and curtain walls for subdividing a large meeting hall are often suspended from the rails of tracks which are affixed to the ceiling or other overhead structure. Adjustable, slot-engaging, fastening hangers, such as disclosed in Kleege, U.S. Pat. No. 7,958,684, incorporated herein by reference, which pass through the slot between the rails of the track, and then rotate ninety degrees to engage the rails, are commonly used for suspending the overhead equipment from the track. These brackets allow the location of suspension to be adjusted along the course of the track as well as some vertical adjustment.

Many type of equipment require cables to provide electrical power and signals. Such cabling attached to overhead equipment often runs in an unsightly, and disorganized manner from the suspended equipment to their interconnecting equipment. For example, a suspended loudspeaker often has a signal cable extending from the speaker to a distant audio amplifier. The cable can be stretched across the expanse of the ceiling area in an unsightly manner, or suspended visibly from hangers engaging the track or other locations attached to the ceiling, beams, or walls. Such hangers take time and skill to install. Sometimes cabling can extend directly to the floor beneath the suspended equipment and then run through flattened rubberized cable runners to the interconnecting equipment. Although such runners are useful to minimize tripping or snag hazards, they remain an obstacle, are often time consuming to install, are of non-optimum lengths, and ultimately offer an unsightly solution.

Therefore, there is a need for a mechanism associated track suspended equipment which addresses some or all of the above identified inadequacies.

SUMMARY

The principal and secondary objects of the invention are to provide an improved suspended equipment cable routing device. These and other objects are achieved by a hand-manipulable, track-engaging barrier plate obstructing portions of the cable from passing through the slot of a track.

In some embodiments there is provided the combination of a track, a length of cable, and a barrier; wherein said track comprises a pair of sidewalls, substantially vertically oriented and substantially parallelly spaced apart to form an inner cross-sectional span; and a pair of rails extending inwardly and substantially parallelly from said sidewalls to form by a slot having a given slot width separating said rails; wherein said barrier is supported by straddling said rails and thereby blocking a portion of said slot; and, wherein a portion of said cable rests atop said barrier thereby prevented by said barrier from passing into said slot; wherein said barrier comprises: a plate having substantially parallel top and bottom surfaces separated by a thickness; said plate having a length dimension and an orthogonal width dimension; wherein said length dimension and said width dimension are greater than said given slot width; and, wherein said plate has at least one fingerhole extending through said plate from said top surface to said bottom surface.

In some embodiments said at least one fingerhole has a radial disuniformity.

In some embodiments said radial disuniformity comprises a radially undulating sidewall.

In some embodiments said radial disuniformity comprises a sidewall surface having a number of asperities.

In some embodiments said radial disuniformity comprises at least one radial notch projecting outwardly into a wall of said at least one fingerhole.

In some embodiments said radial disuniformity comprises at least one radial bump projecting inwardly from a wall of said at least one fingerhole.

In some embodiments said at least one fingerhole has a minimum diameter of between about 13 mm (0.5 inch) and about 32 mm (1.25 inch).

In some embodiments said plate is substantially quadrangular having rounded corners.

In some embodiments a ratio between said length dimension and said width dimension is between about 5:4 and about 2:1.

In some embodiments said thickness is between about 1 mm (0.04 inch) and about 6 mm (0.25 inch).

In some embodiments said plate is made from a semi-rigid, deflectable material.

In some embodiments said material has a Young's modulus of between about 0.5 GPa and about 5.0 GPa.

In some embodiments said barrier is made from a darker color than said track, thereby obscuring the presence of the barrier within the track.

In some embodiments there is provided a barrier for resting atop a pair of rails projecting inwardly from a pair of sidewalls in a ceiling mounted track thereby forming a slot of a given width, said barrier comprises; a plate having substantially parallel top and bottom surfaces separated by a thickness; said plate having a length dimension and an orthogonal width dimension; wherein said length dimension and said width dimension are greater than said given slot width; wherein said plate has at least one fingerhole extending through said plate from said top surface to said bottom surface; and, wherein said at least one fingerhole has a radial disuniformity.

In some embodiments there is provided a method for suspending a cable within the inner channel of a suspended track having a bottom slot of a given width, said method comprises: selecting a substantially planar barrier plate having a width dimension greater than said given width and at least one fingerhole; engaging said at least one fingerhole by the finger of a user; angling said plate with respect to said rails; inserting a first edge of said plate through said slot;

rotating said plate until said plate contacts a first one of said rails; pushing said plate entirely into said channel; sliding a second edge of said plate over a second one of said rails; and, verifying said cable rests atop said plate by observing said cable through said at least one fingerhole.

In some embodiments the method further comprises: installing a plurality of plates into said channel; sliding one or more of said plurality of plates longitudinally to form a spacing between adjacent ones of said plurality of plates.

The original text of the original claims is incorporated herein by reference as describing features in some embodiments.

DESCRIPTION OF THE EXEMPLARY EMBODIMENTS

Figure 1:
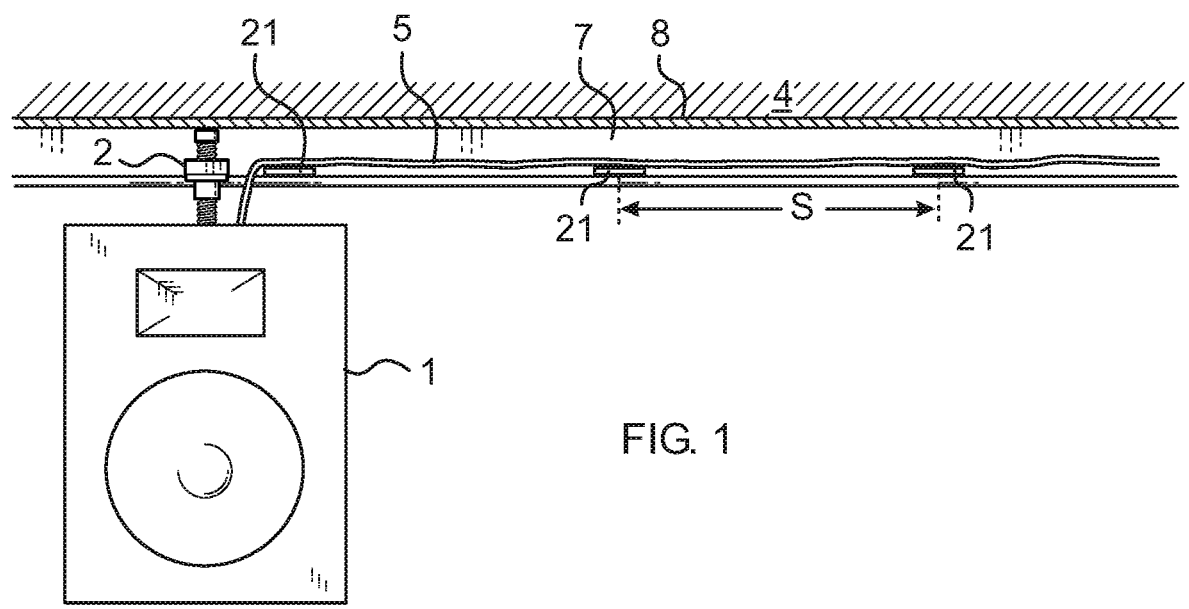
FIG. 1 is a diagrammatic partial cross-sectional side view of a ceiling track engaged by a plurality of hand-manipulable, track-engaging barrier plates according to an exemplary embodiment of the invention.
Figure 2:
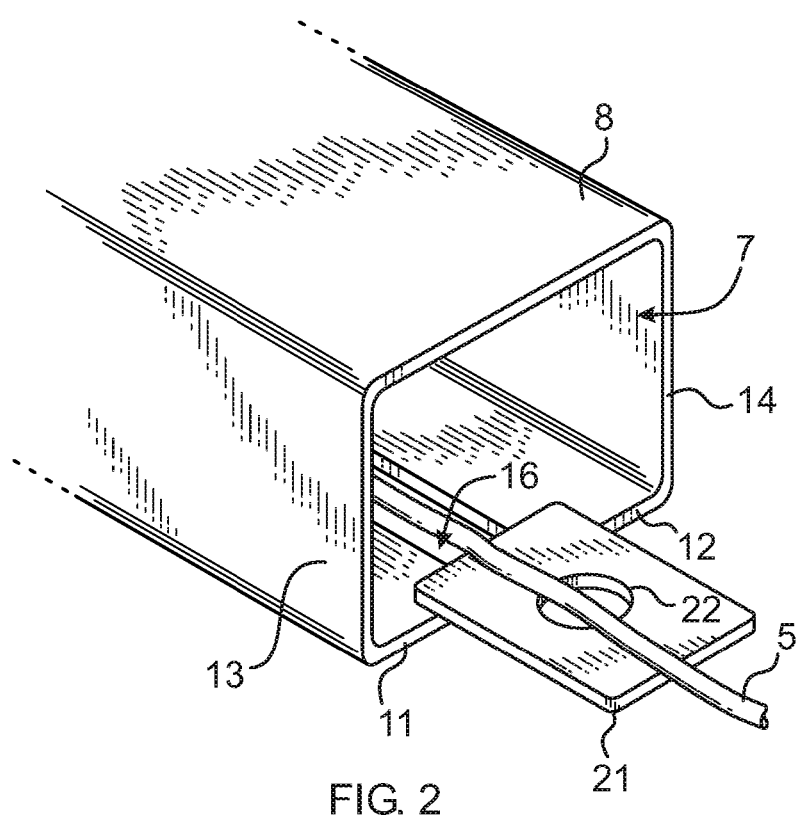
FIG. 2 is a diagrammatic perspective view of a section of a ceiling track engaged by a barrier plate.

In this specification, the references to top, bottom, upward, downward, upper, lower, vertical, horizontal, sideways, lateral, back, front, etc. can be used to provide a clear frame of reference for the various structures with respect to other structures while the barrier is loaded in a ceiling track as shown in FIGS. 1 and 2, and not treated as absolutes when the frame of reference is changed, such as when the barrier is removed, laying on the ground, or otherwise disassembled.

The term "substantially" can be used in this specification because manufacturing imprecision and inaccuracies can lead to non-symmetricity and other inexactitudes in the shape, dimensioning and orientation of various structures. Further, use of "substantially" in connection with certain geometrical shapes and orientations, such as "parallel" and "perpendicular", can be given as a guide to generally describe the function of various structures, and to allow for slight departures from exact mathematical geometrical shapes and orientations, while providing adequately similar function. Those skilled in the art will readily appreciate the degree to which a departure can be made from the mathematically exact geometrical references.

Referring now to the drawing, there is shown in FIG. 1 an item 1 such as an audio speaker, suspended from an elongated track 8 affixed to a ceiling 4. The speaker is suspended by an adjustable, track-engaging fastener 2. A cable 5 carries electronic signals to the suspended speaker. The cable can be run through the hollow inner channel 7 of the track and adjustably held in place by a number of hand-manipulable, track-engaging, cable-suspending plates acting as barriers 21 according to an exemplary embodiment of the invention. The barriers can be spaced longitudinally apart from each other along the track by a somewhat variable spacing S which prevents the cable from escaping out of the bottom slot of the track. The spacing between barriers is dependent upon the various mechanical characteristics of the cable such as it flexibility, its size, and its weight per unit length.

FIG. 2 shows a cutaway section of the track 8 including a length of cable 5 and a cable supporting barrier 21. The barrier can rest upon the bottom, inwardly extending parallel rails 11,12 of the track, blocking the slot 16 between the rails. The rails can project substantially horizontally inwardly in a cantilevered manner from the bottom edges of the substantially vertical, substantially parallel sidewalls 13,14 of the track. The barrier blocks the portion cable contacting the barrier, and portions of the cable extending longitudinally beyond the ends of the barrier for a minor distance. A fingerhole 22 can extend through the barrier to allow easier manipulation of the barrier. In this way the barrier can be inserted completely into the internal channel of the track and manipulated using the fingerhole to block downward movement of the cable through the slot.

Figure 3:
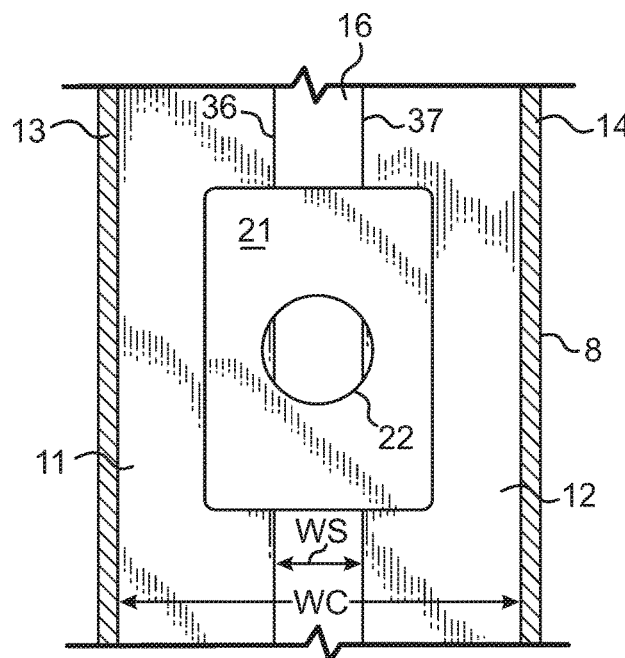
FIG. 3 is a diagrammatic partial cross-sectional top view of the track and plate of FIG. 2.
Figure 4:
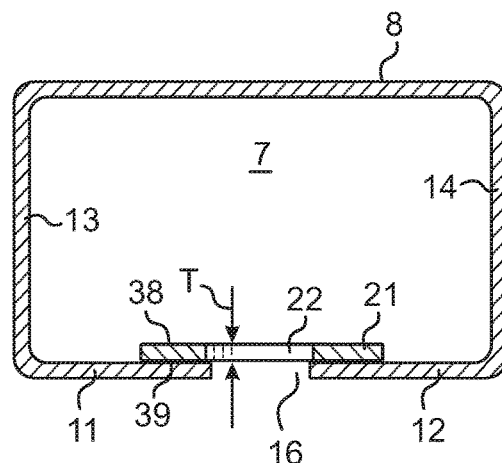
FIG. 4 is a diagrammatic cross-sectional end view of the track and plate of FIG. 2.
Figure 5:
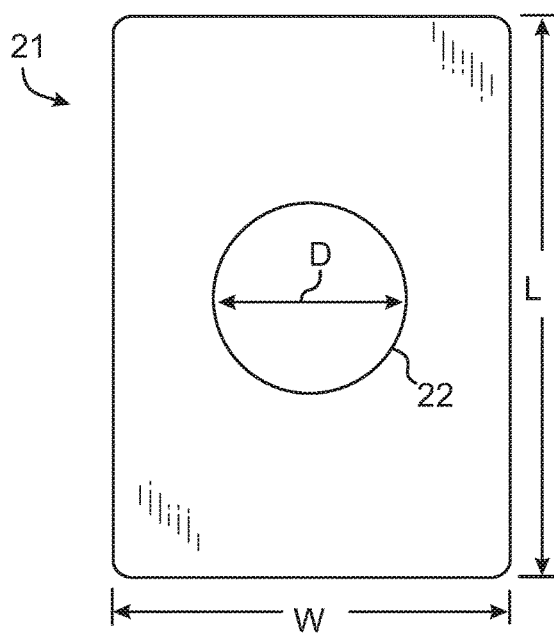
FIG. 5 is a diagrammatic top view of the plate of FIG. 2.

As shown in FIGS. 3-5, the sidewalls 13,14 of the track 8 can be separated by a channel width WC. The free edges 36,37 of the rails 11,12 can be parallelly spaced apart from one another to form the slot 16 therebetween having a given width WS.

The barrier plate 21 can have a generally oblong quadrangular shape having mutually orthogonal length L and width W dimensions, though other shapes are possible. The plate can have substantially planar top 38 and bottom 39 surfaces parallely separated by a thickness T dimension. The dimensions can be selected to allow the barrier to be used in a wide variety of tracks having variously sized slots.

For a substantially quadrangular plate, it has been found that a ratio between the length and width dimensions of a range from between about 5:4 and about 2:1 provides adequate functionality for most common tracks. Thus, given this range of ratios, the width dimensioning can range from between about 25 mm (1.0 inch) and about 65 mm (2.5 inches), and the length dimensioning can range from between about 31 mm (1.2 inches) and about 130 mm (5.0 inches). A more preferred width dimensioning for most applications can be between about 44 mm (1.75 inches) and about 57 mm (2.25 inches), while a more preferred length dimensioning can be between about 57 mm (2.25 inches) and about 75 mm (3.0 inches). An even more preferred width range can be between about 46 mm (1.8 inches) and about 51 mm (2.0 inches), while an even more preferred length dimensioning can be between about 63 mm (2.5 inches) and about 69 mm (2.7 inches). An example of a preferred dimensioning is a width of about 48 mm (1.9 inches) and a length of about 66 mm (2.6 inches).

The thickness dimension is selected given the length and width dimensioning to allow adequate support of the weight of the cable portion being suspended while minimizing the amount of material forming the plate. For most inexpensive semi-rigid plastics and most hanger applications for electrical cabling in the most common track sizes, a preferred range of thicknesses can be between about 1 mm (0.04 inch) and 6 mm (0.25 inch). More preferably that range can be between about 1 mm (0.04 inch) and 3 mm (0.1 inch). Even more preferably that range can be between about 1.3 mm (0.05 inch) and 1.8 mm (0.07 inch). An example preferred thickness is about 1.5 mm (0.06 inches) when using the above example for the width and length.

The plate 21 can have a fingerhole 22 extending between the top and bottom surfaces 38,39 so that it completely penetrates through the plate. The fingerhole is sized and shaped to allow the passage of a user's finger therethrough in order to positively grasp and manipulate the plate using a single finger. Thus, the fingerhole can be substantially cylindrical as shown in FIGS. 2-6 having a diameter D of between about 13 mm (0.5 inch) and about 32 mm (1.25 inch). Other shapes may be used such as ellipses, ovals, and rounded or squared off triangle, squares, rectangles, or other polygons. For non-cylindrically shaped fingerholes, the minimum diametric dimension should use the above range. It is often useful to have the fingerhole diameter be greater than the width WS of the slot 16 between the rails 11,12 of the track 8 so that the user can see and/or feel the free edges 36,37 of the rails during manipulation. It is important to note that a tool rather than a finger can be used to engage the fingerhole and manipulate the location and orientation of the plate.

Figure 6:
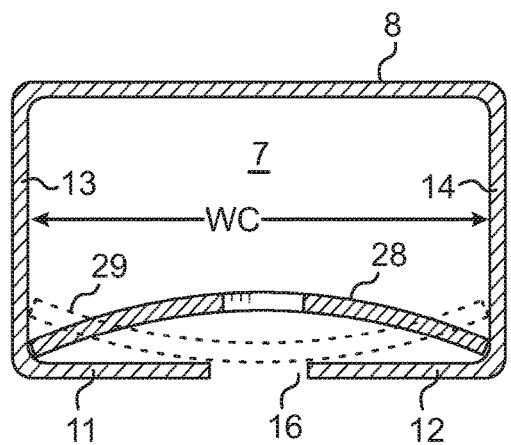
FIG. 6 is a diagrammatic cross-sectional end view of the track engaged by an oversize plate.

The barrier 21 can be made from a plate of a uniformly solid, durable, strong, semi-rigid and relatively inexpensive material such injection molded plastic. A material having a Young's modulus of between about 0.5 GPa and about 5.0 Gpa would provide adequate stiffness and flexibility. In this way, as shown in FIG. 6, if necessary, an oversized plate 28 can be laterally compressed to fit within the channel width WC by bending the plate to have an arcuate cross-section. The plate can bend in a downwardly concave manner as shown, or can bend in an upwardly concave manner 29 as shown in dotted line.

Figure 7:
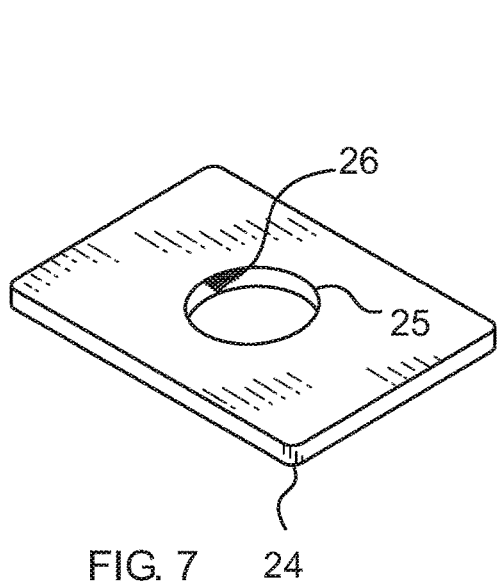
FIG. 7 is a diagrammatic perspective view of a barrier plate showing fingerhole knurling.
Figure 8:
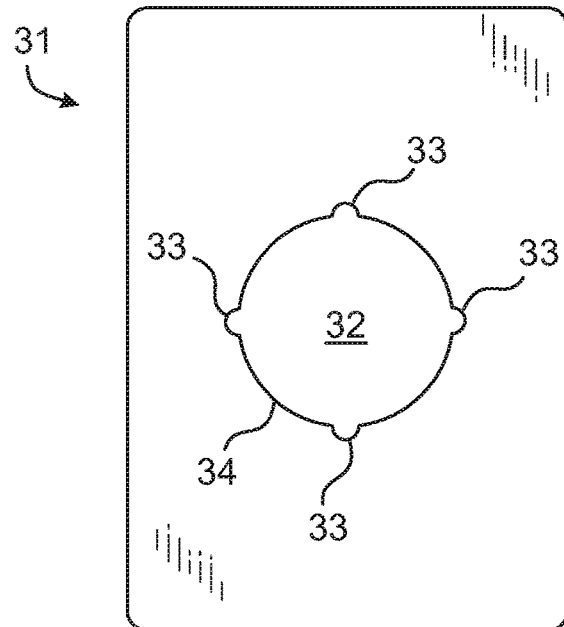
FIG. 8 is a diagrammatic top view of a plate having an alternate fingerhole shape.
Figure 9:
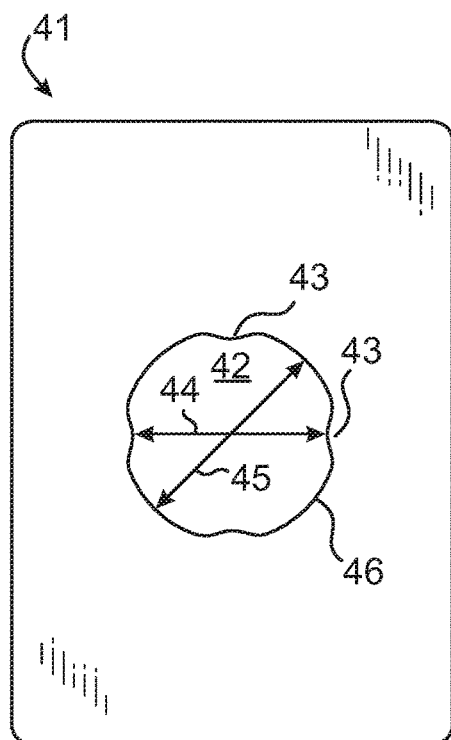
FIG. 9 is a diagrammatic top view of a plate having an alternate fingerhole shape.

Referring now to FIGS. 7-9, in order to enhance the manipulatability of the plate, the fingerhole can have radial irregularities or disuniformities.

FIG. 7 shows that such disuniformities can be in the form of texturing such as knurling 26 formed into the wall of the fingerhole 25 of the plate 24 creating a plurality of asperities which can enhance friction. The radial disuniformities frictionally bear against the pad of a user's finger to allow greater control of the plate orientation while engaged in the track channel. Torsional motions of the finger can cause the plate to rotate even while fully inserted in the track channel.

FIG. 8 shows a plate 31 having an alternately shaped fingerhole 32 having a plurality of notches 33 extending radially outwardly from the substantially cylindrical wall 34.

FIG. 9 shows a plate 41 having an alternately shaped fingerhole 42 having a plurality of bumps 43 extending radially inwardly from the substantially cylindrical wall 46. This creates a fingerhole having a radially undulating sidewall where both a minimum diametric dimension 44 and a maximum diametric dimension 45 different from one another. In this way the maximum diametric dimension can be greater than the slot width between the track rails, while the minimum diametric dimension can be less than the slot width. This promotes adequate control during manipulation without sacrificing the ability to sense through sight and touch the rail edges.

Figure 10:
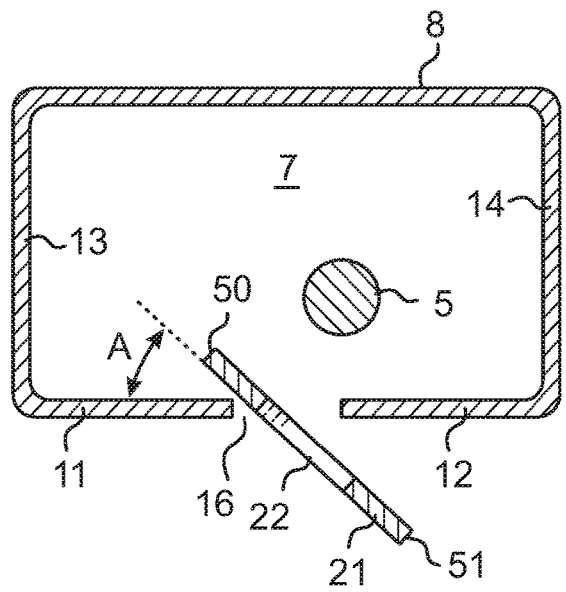
FIG. 10 is a diagrammatic cross-sectional end view of the track being engaged by a plate.
Figure 11:
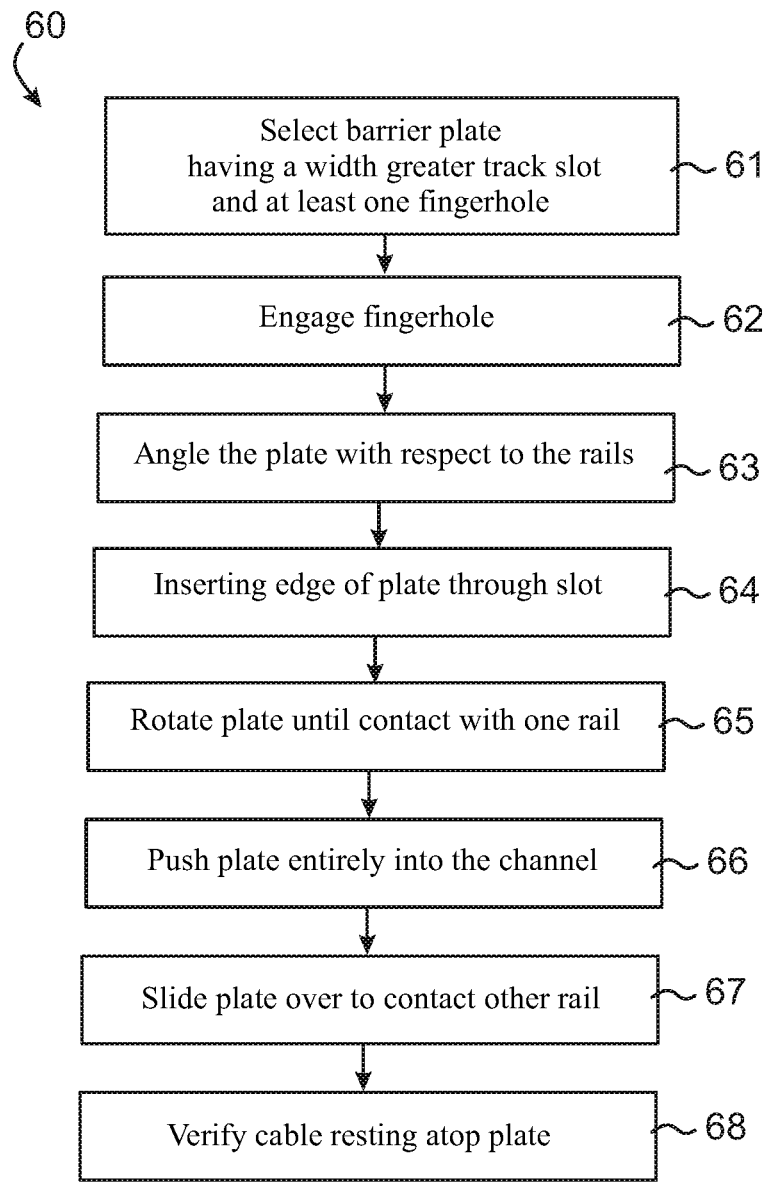
FIG. 11 is a flow-chart diagram of the primary steps of a method for suspending a cable within a track according to an exemplary embodiment of the invention.
Figure 12:
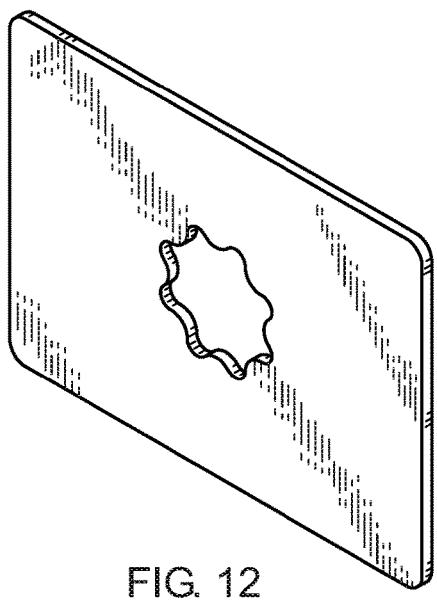
FIG. 12 shows the top, back, right side perspective view of an ornamental design of a barrier plate according to an exemplary embodiment of the invention.
Figure 14:
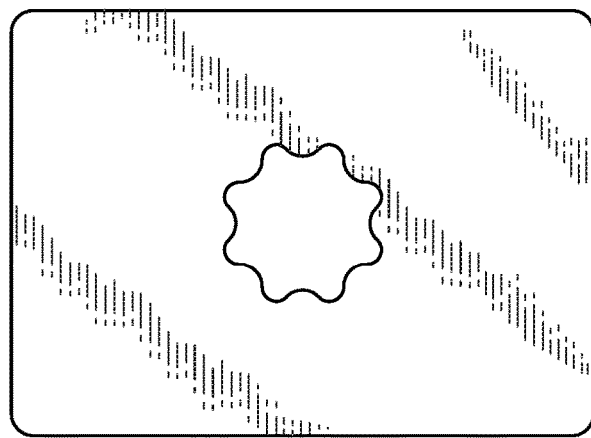
FIG. 14 shows the top view of the design of FIG. 12, the bottom being a mirror image thereof.
Figure 13:
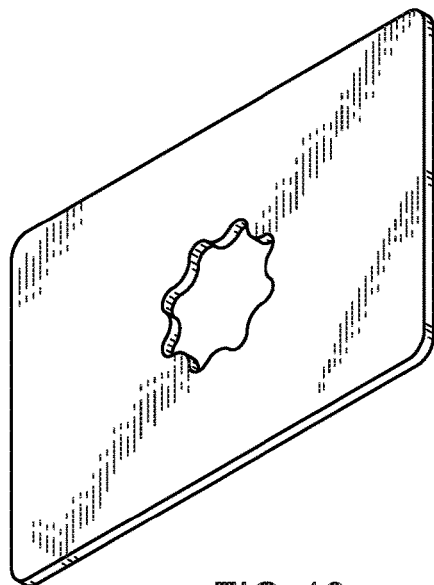
FIG. 13 shows the bottom, front, left side perspective view of the design of FIG. 12.
Figure 15:
FIG. 15 shows the front view of the design of FIG. 12, the back being a mirror image thereof.
Figure 16:
FIG. 16 shows the right side view of the design of FIG. 12, the left side being a mirror image thereof.

FIGS. 10 and 11 show a method 60 whereby a barrier plate 21 can be installed into the inner channel 7 of a ceiling-mounted track 8 an this block a cable 5 from falling out through the slot 16 between the rails 11,12. A substantially planar barrier plate is selected 61 to have a width dimension greater than the width of the slot and at least one fingerhole. The user engages 62 the fingerhole 22, then angles 63 the plate at an angle A with respect to the rails so that a first edge 50 can be inserted 64 through the slot 16. Then the user can rotate 65 the plate until it contacts one of the rails 11 and push 66 the plate entirely into the inner channel so that the second edge 51 passes through the slot. Further rotation of the plate can make it parallel to the rails. The user then slides 67 the plate toward the other rail 12 until the second edge rests on the other rail. The plate can then support the cable and prevent it from passing into the slot. The user can verify 68 that the cable is resting against the plate by observing said cable through the fingerhole. After installation of other barriers, the longitudinal position of the barriers in the track so as to space them to efficiently and adequately keep the cable hidden in the track.

FIG. 11 shows a method 60 for suspending a cable in a ceiling-mounted track by fully inserting a barrier plate 21 into the inner channel 7 in order to block the cable from falling out through the slot 16 between the rails 11,12.

The plates can be colored black or another darkened color, and can be darker than the track material in order to blend in with the background color inside the track, thus obscuring the existence of the installed plate and supported cable. Alternately, the plates can be made of transparent materials. Further, the plates can be made a bright color to indicate to technicians on the ground the existence and location of the plates. Plates can also be color coded to indicate which of many cables are supported within the track. Since the plates can be easily injection molded from many different types of plastic, their color is easily selectable during manufacture.

FIGS. 12-16 show my ornamental design for a cable support barrier for ceiling mounted tracks.

While the preferred embodiments of the invention have been described, modifications can be made and other embodiments may be devised without departing from the spirit of the invention and the scope of the appended claims.

What is claimed is:

1. An apparatus comprising a track, a length of cable, and a barrier;

wherein said track comprises a pair of sidewalls, substantially vertically oriented and substantially parallelly spaced apart to form an inner cross-sectional span; and a pair of rails that extends inwardly and substantially parallelly from said sidewalls to form by a slot having a given slot width that separates said rails;

wherein said barrier straddles said rails and thereby blocking a portion of said slot; and, wherein a portion of said cable rests atop said barrier thereby prevented by said barrier from passing into said slot;

wherein said barrier comprises:

a plate having substantially parallel top and bottom surfaces separated by a thickness;

said plate having a length dimension and an orthogonal width dimension;

wherein said length dimension and said width dimension are greater than said given slot width; and, wherein said plate has at least one fingerhole that extends through said plate from said top surface to said bottom surface.

2. The apparatus of claim 1, wherein said at least one fingerhole has a radial disuniformity.

3. The apparatus of claim 2, wherein said radial disuniformity comprises a radially undulating sidewall.

4. The apparatus of claim 2, wherein said radial disuniformity comprises a sidewall surface having a number of asperities.

5. The apparatus of claim 2, wherein said radial disuniformity comprises at least one radial notch that projects outwardly into a wall of said at least one fingerhole.

6. The apparatus of claim 2, wherein said radial disuniformity comprises at least one radial bump that projects inwardly from a wall of said at least one fingerhole.

7. The apparatus of claim 1, wherein said at least one fingerhole has a minimum diameter of between 13 mm (0.5 inch) and 32 mm (1.25 inch).

8. The apparatus of claim 1, wherein said plate is substantially quadrangular.

9. The apparatus of claim 8, which further comprises rounded corners.

10. The apparatus of claim 8, wherein a ratio between said length dimension and said width dimension is between 5:4 and 2:1.

11. The apparatus of claim 1, wherein said thickness is between 1 mm (0.04 inch) and 6 mm (0.25 inch).

12. The apparatus of claim 1, wherein said plate is made from a semi-rigid, deflectable material.

13. The apparatus of claim 12, wherein said material has a Young's modulus of between 0.5 GPa and 5.0 GPa.

14. The apparatus of claim 1, wherein said barrier is made from a darker color than said track, thereby obscuring the presence of the barrier within the track.

15. A barrier for resting atop a pair of rails projecting inwardly from a pair of sidewalls in a ceiling mounted track thereby forming a slot of a given width, said barrier comprises;

a plate having substantially parallel top and bottom surfaces separated by a thickness;

said plate having a length dimension and an orthogonal width dimension;

wherein said length dimension and said width dimension are greater than said given slot width;

wherein said plate has at least one fingerhole that extends through said plate from said top surface to said bottom surface; and, wherein said at least one fingerhole has a radial disuniformity.

16. A method for suspending a cable within the inner channel of a suspended track having a bottom slot of a given width, said method comprises:

selecting a substantially planar barrier plate having a width dimension greater than said given width and at least one fingerhole;

engaging said at least one fingerhole by the finger of a user;

angling said plate with respect to said rails;

inserting a first edge of said plate through said slot;

rotating said plate until said plate contacts a first one of said rails;

pushing said plate entirely into said channel;

sliding a second edge of said plate over a second one of said rails; and, verifying said cable rests atop said plate by observing said cable through said at least one fingerhole.

17. The method of claim 16, which further comprises:

installing a plurality of plates into said channel;

sliding one or more of said plurality of plates longitudinally to form a spacing between adjacent ones of said plurality of plates.

* * * * *